United States Patent
Kanai et al.

(10) Patent No.: US 6,421,309 B1
(45) Date of Patent: Jul. 16, 2002

(54) APPARATUS AND METHOD FOR DETECTING MAXIMUM MARK LENGTHS

(75) Inventors: Toshio Kanai; Teruhiko Ushio, both of Moriyama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/388,751

(22) Filed: Sep. 2, 1999

(30) Foreign Application Priority Data

Sep. 8, 1998 (JP) .......................................... 10-253936

(51) Int. Cl.$^7$ ................................................ G11B 7/00
(52) U.S. Cl. ................................. 369/59.17; 369/59.22
(58) Field of Search ......................... 369/47.17, 47.18, 369/59.22

(56) References Cited

U.S. PATENT DOCUMENTS 5,875,163 A * 2/1999 Kuroda et al. ................ 369/50
5,978,335 A * 11/1999 Clark et al. ................... 369/54
6,236,631 B1 * 5/2001 Deguchi et al. .............. 369/54

* cited by examiner

*Primary Examiner*—Nabil Hindi
(74) *Attorney, Agent, or Firm*—Randall J. Bluestone; Brian C. Kunzler

(57) ABSTRACT

A maximum mark length detector comprising a total value register for storing a total value Lsum of measured mark lengths; a measured value register for storing a measured value of a mark length; an arithmetic unit for computing the sum Lp of a current measured value Lk and a previously measured value PLk stored in the measured value register and subtracting a maximum value Lmax from the total value Lsum when the total value Lsum reaches the measured maximum value Lmax; a counter to count the number of times the subtraction is performed; and a comparator for completing the detection when a count value C of the counter reaches a predetermined value.

17 Claims, 9 Drawing Sheets

APPARATUS AND METHOD FOR DETECTING MAXIMUM MARK LENGTHS

BACKGROUND OF THE INVENTION

1. Field of the Invention

The present invention relates to data retrieval systems, and more particularly to an apparatus and method for detecting a maximum mark length recorded on an optical disk.

2. Description of Related Art

In an optical disk such as a compact disc (CD) or a digital versatile disc (DVD), the frequency of signals read from the disk vary due to disk rotation speed variations. Also, the greater the radial distance of a track to the center of the disk the longer its length. Accordingly, in a constant angular velocity (CAV) system, the linear velocity is greater toward the outer circumference of the disk. As a result, even when the disk is rotated at a constant speed, a signal read from the outer circumference has a higher frequency. In general, the frequency may vary over an operating range of approximately ±30% to ±50%.

As a general countermeasure against such variation in the frequency, a reference or basic frequency is calculated based on signals recorded on the disk, and then the calculated reference frequency is set as the center frequency of a phase-locked loop (PLL). The reference frequency is generally calculated by using a maximum mark length obtained in a frame synchronous area (sync area) which are placed at regular intervals in the frames. A sync area as used herein means an area where the starting position of a data area is defined by a code not existing in the data area. In such a sync area, a frame number (frame ID) and a frame sync code used for frame synchronization are written. The frame sync code includes a longest mark for the synchronization (frame synchronization) that is longer than any other mark in the data areas. This longest mark is usually detected for computing the reference frequency.

In an optical disk such as a DVD, data are spirally or concentrically recorded on the surface of the disk. The data are recorded by using marks each having a length along the circumferential (tracking) direction. A mark is detected by using a difference in the quantity of reflected light depending upon the presence or absence of a mark (that is, a pit or a land) under irradiation with a laser beam or the like. For example, a mark can be detected on the basis of an interval between crossing points of a preset slice level and the quantity of reflected light (output waveform). In general, the length of a mark (hereinafter referred to as the "mark length") is represented by using a time interval nT between the crossing points, where T indicates time per bit (namely, a fundamental period), and n is an integer. The mark is recorded with a length of an integral multiple of the fundamental period T. The reference frequency can be obtained as 1/T based on the fundamental period T. Hereinafter, a mark with a mark length of nT is expressed as a mark nT.

A conventional maximum mark length detector has, for example, a structure as shown in FIG. 6. The maximum mark length detector 90 comprises a measuring device 92 for measuring mark lengths Lk, a maximum value register 94 for storing a maximum value Lmax of measured mark lengths Lk, and a comparator 96 for comparing the maximum value Lmax stored in the maximum value register 94 with a measured mark length Lk. When the measured mark length Lk is greater than the current maximum value Lmax in the register 94, a control unit 98 substitutes the measured mark length Lk for the maximum value Lmax in the maximum value register 94.

The maximum mark length can be detected, for example, by using a procedure as shown in FIG. 7 in which the detection is conducted twice. It is assumed that a first maximum mark length Lmax1 is first detected (step S180), and subsequently, a second maximum mark length Lmax2 is detected (step S182). Then, the comparator 96 compares these maximum mark lengths Lmax1 and Lmax2 (step S184). When they are equal to each other, the detection is completed because the maximum mark length has been detected. In contrast, when they are different from each other, the detection is started over again. The measurement is carried out twice in order to confirm the value of the maximum mark length Lmax1. On the basis of the maximum mark length thus detected, the reference frequency of signals to be read from the disk can be obtained. However, usually the maximum mark lengths Lmax1 and Lmax2 do not exactly accord with each other due to the influence of measurement error, noise and the like. Therefore, typically they are considered to be equivalent, when:

$$Lmax1 - Lmax2 < \Delta L$$

where $\Delta L$ indicates a tolerance which takes into account measurement error, noise and the like.

In the detection of the maximum mark lengths (step S180 and step S182), a mark detection time Tw is set, which has a duration of an integral multiple of a system clock and is selected to necessarily include a maximum length mark so that a maximum mark length can be detected within the detection time Tw. The detection (step S180 and step S182) can be carried out by using a procedure as shown in FIG. 8, for example. First, when measuring device 92 provides a new measured mark length (measured value Lk) (step S192), the measured value Lk is compared with a current maximum value Lmax in the register 94 (step S194). When the measured value Lk is greater than the current maximum value Lmax, the measured value Lk is substituted for the maximum value Lmax in the register 94 as a new current maximum value (step S196). The maximum value Lmax in the register 94 is initially set to zero (step S190). Subsequently, the comparator 96 compares the elapsed time count measured by control unit 98 with the mark detection time Tw (step S198). When the measured elapsed time reaches the detection time Tw, the measurement of mark lengths is completed. In contrast, when the measured elapsed time does not reach the detection time Tw, a subsequent mark length is measured (step S192).

As described above, in the prior art, a fixed value related to the system clock has been used as the mark detection time Tw. However, as is shown in FIG. 9, when a disk 60 is rotated at a constant speed, the time interval between two sync areas 62 (hereinafter referred to as the "sync area interval") varies due to the difference in the linear velocity between the inner circumference and the outer circumference. Accordingly, a signal read from the outer circumference has a higher frequency.

FIG. 9, a reference numeral 64 denotes a data area, Tso indicates a sync area interval in the outermost circumference and Tsi indicates a sync area interval in the innermost circumference. Furthermore, the mark detection time Tw is required to include at least one sync area 62 (where a longest mark is recorded). Therefore, the mark detection time Tw is set on the basis of the sync area interval in the innermost circumference where the lowest frequency is obtained.

When such a fixed mark detection time Tw is used, as shown in FIG. 9, for example, the mark detection time Tw includes merely one sync area 62 in the innermost circumference but includes plural (seven in FIG. 9) sync areas 62 in the outermost circumference. However, one sync area 62 is sufficient for the detection. Therefore, in the outermost circumference, the maximum mark length detection is carried out even in the superfluous six sync areas 62. Accordingly, six sevenths of the detection time is wasted in the outermost circumference. This increases the wait time before the start of a data read operation.

Moreover, a mark length is detected on the basis of the interval between the crossing points of the output waveform obtained from the disk and the slice level. Therefore, referring to an output waveform 70 shown in FIG. 10, when the slice level lowers (as is shown with a reference numeral 74), two consecutive mark lengths L' (k-1) and L' (k) to be measured are:

$$L'(k-1)=L(k-1)-2\Delta T$$

$$L'(k)=L(k)+2\Delta T$$

where L(k-1) and L(k) indicate measured values obtained when the slice level is correct (as shown with a reference numeral 72), and ΔT indicates a measurement error of the mark lengths derived from an error of the slice level. In this manner, the variation of the slice level leads to an error in the measurement of a mark length. Therefore, even when marks with the same mark length are compared, there is a possibility that these marks are identified as different marks due to the error in the measured mark lengths. Furthermore, if the measured maximum mark length includes an error, then that error causes errors in the calculated reference frequency.

Accordingly, it is an object of the present invention to solve the aforementioned problems.

SUMMARY OF THE INVENTION

The present invention provides a system of detecting a maximum mark length used for computing a reference frequency for signals to be read from a disk medium in which data are recorded by using predetermined marks having different lengths in a circumferential direction. Sync areas spaced at a predetermined interval in the circumferential direction each include a mark pair comprising a longest mark and a short mark subsequent to the longest mark. A maximum mark length is detected by: storing a measured mark length; measuring the length of a mark subsequent to the measured mark; computing the sum, referred to as a mark pair, of the stored mark length and the subsequently measured mark length; computing a ratio between the sum and a current measured mark length; and comparing the ratio with a predetermined value to determine whether the sum corresponds to a maximum mark pair length. The maximum detected mark pair length in a sync area is then used for computing the reference frequency.

A maximum mark length detector detects a maximum mark length used for computing a reference frequency for signals to be read from a disk medium in which data are recorded by using predetermined marks respectively having different lengths in a circumferential direction and sync areas spaced at a predetermined interval in the circumferential direction. Each sync area includes a mark pair comprising a longest mark and a short mark subsequent to said longest mark.

The maximum mark length detector comprises a measured value register for storing a measured mark length and an adder for computing the sum of a current measured mark length and a previously measured mark length stored in the measured value register, wherein the length of the mark pair given by the sum of the length of the longest mark and the length of the short mark is detected as a maximum mark pair length and used as the maximum mark length for computing the reference frequency.

Moreover, the method of detecting a maximum mark length according to the present invention further comprises the steps of determining the total value of mark lengths measured after a current maximum value of the sum of the measured mark lengths is newly detected, and the step of completing detection when the total value reaches a value corresponding to an interval between the longest marks.

The maximum mark length detector further comprises a total value register for storing a total value of mark lengths measured after a new current maximum value of the sum of the measured mark lengths is detected, an adder for adding a measured value to the total value, and a detection completion logic unit to determine the method of detecting a maximum mark length is complete when the total value reaches a value corresponding to an interval between two of the longest marks.

DETAILED DESCRIPTION OF THE PREFERRED EMBODIMENTS

Preferred embodiments of an apparatus and method for detecting a maximum mark length according to the invention will now be described in detail with reference to accompanying drawings.

Figure 1:
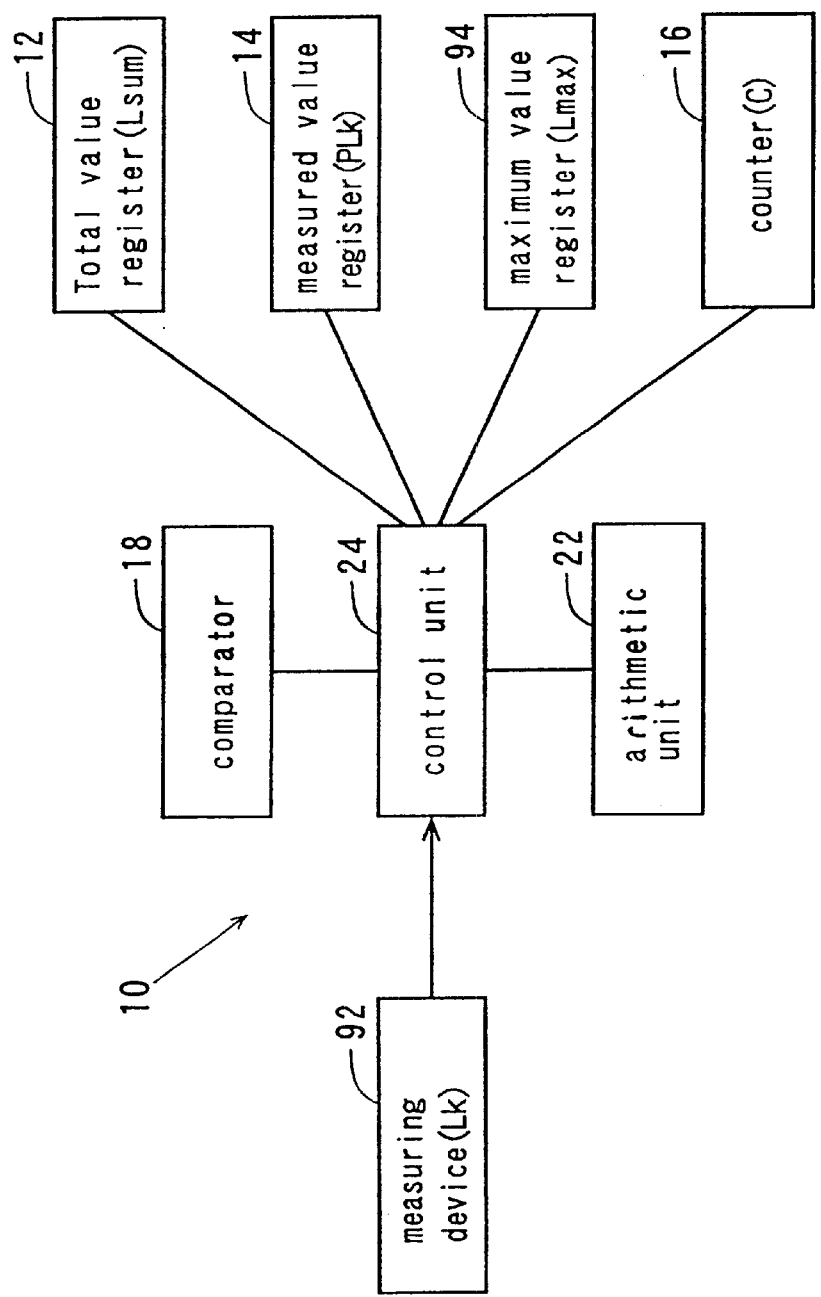
FIG. 1 is a block diagram of a maximum mark length detector according to one embodiment of the present invention.

FIG. 1 is a block diagram of a maximum mark length detector 10. The detector comprises a total value or sum register 12, a measured value register 14, a counter 16, an arithmetic unit 22, a comparator 18, a measuring device 92 and a maximum value register 94. Total value register 12, measured value register 14, counter 16, arithmetic unit 22, comparator 18, measuring device 92 and maximum value register 94 are connected with a control unit 24.

Total value register 12 stores a total value, Lsum, of mark lengths, Lk, measured after a current maximum value, Lmax, of the sum of lengths of two adjacent marks, Lp, is measured. Total value register 12 can be any suitable read/write memory device. Measured value register 14 stores at least a previously measured value, Plk. Measured value register 14 can be any suitable read/write memory device. Arithmetic unit 22 performs several arithmetic operations including: it calculates the sum, Lp, of a previously measured value, PLk, and a current measured value, Lk; it calculates a ratio RL between the sum, Lp, and the measured value, Lk; it adds the current measured value, Lk, to the total value, Lsum; and it subtracts a predetermined maximum value, Lmax, from the total value Lsum. Arithmetic unit 22 can be any suitable arithmetic circuit at least capable of addition, subtraction and division.

Counter 16 counts the number of times the predetermined maximum value Lmax is subtracted from the total value Lsum, as is described in more detail below. Counter 16 can be any suitable counter circuit. In this embodiment, the counter 16 stores a count value C, and the count value C is incremented by the arithmetic unit 22 after every subtraction operation. Comparator 18 performs several comparison operations: it compares the ratio RL with a predetermined value; it compares sum Lp with a current maximum value Lmax in the register 94; it compares the total value Lsum with the predetermined maximum value Lmax; and it compares the count value C with a predetermined value. Comparator 18 can be any suitable comparing circuit. The combination of arithmetic unit 22 and counter 16 form one embodiment of a detection completion logic unit. The maximum mark length detection process is determined to be complete when the counter reaches a predetermined value, as is described in more detail below.

Maximum value register 94 stores a current maximum value Lmax of the sum Lp of the two mark lengths determined by the arithmetic unit 22, instead of storing the measured value Lk as in the conventional detector. The current maximum value in the register 94 is a temporary maximum value and is updated each time a new maximum value greater than the current value in the register 94 is detected. Measuring device 92 inputs a measured value to control unit 24. Control unit 24 controls total value register 12, measured value register 14, counter 16, arithmetic unit 22, comparator 18, measuring device 92 and maximum value register 94.

The following describes a process for detecting the maximum mark length performed by maximum mark length detector 10. This embodiment, describes detecting a maximum mark length in the context of a DVD device. DVD data is 8/16 modulated and marks with lengths of 3T through 11T are recorded in data areas. On the DVD, sync areas (frame synchronous areas) different from the data areas are provided at an interval of 1488T. In each of the sync areas, a pair of marks with one mark having a 14T length (maximum mark length) and the second mark having a 4T length are adjacently recorded as a frame sync signal.

Figure 2:
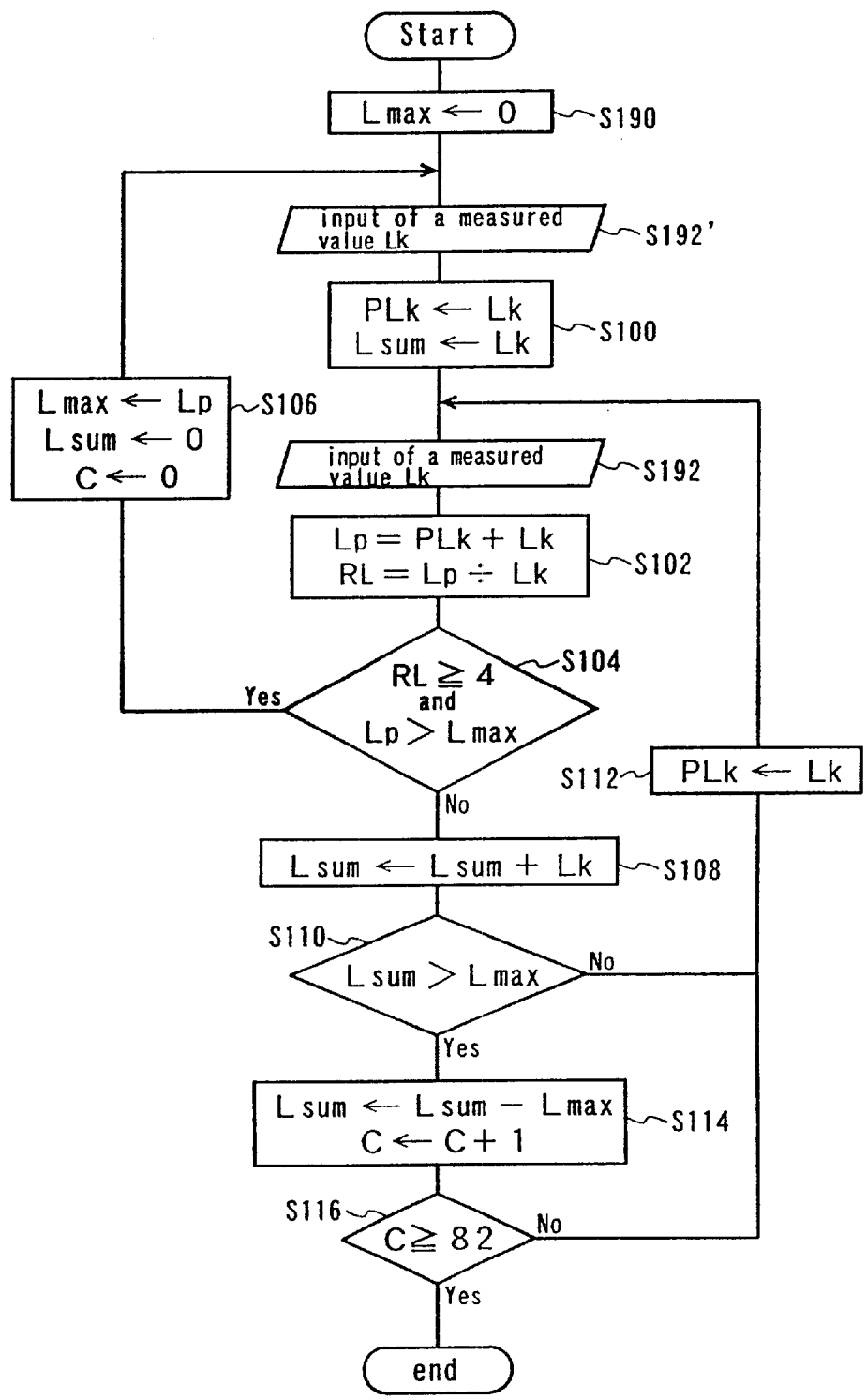
FIG. 2 is a flowchart for detecting a maximum mark length using the maximum mark length detector of FIG. 1 according to one embodiment of the present invention.

FIG. 2 illustrates a process for detecting a maximum mark length. The process is executed by maximum mark length detector 10. The sum of the lengths of two adjacent marks is measured to identify the largest sum (14T+4T). This sum defines the maximum value Lmax. When measuring device 92 measures a mark length value Lk of an arbitrary mark (step S192'), the value is stored in the measured value register 14 as a previously measured value PLk and in the total value register 12 as a total value Lsum (step S100). Subsequently, when another mark length, Lk, is measured (step S192), the arithmetic unit 22 calculates the sum Lp of this measured value Lk and the previously measured value Plk; arithmetic unit 22 also calculates a ratio RL of Lp to Lk (step S102).

Combinations of two adjacent marks (hereinafter referred to as mark pairs) which yield an RL ratio of at least four in the DVD are a combination of {14T, 4T}, which is a target mark pair to be detected, and combinations of {11T, 3T}, {10T, 3T}, and {9T, 3T}. Accordingly, when RL is determined to be at least four, there is a possibility that the sum Lp used in the calculation of the ratio RL may be the sum of the maximum mark length 14T and the adjacent mark length 4T. The sums Lp of the mark pairs which give an RL ratio of at least four are 18T (=14T+4T), 14T (=11T+3T), 13T (=10T+3T) and 12T (=9T+3T). Therefore, the target mark pair {14T, 4T} has the largest sum Lp among the combinations which give an RL ratio of at least four. Thus, a mark pair is identified as the target mark pair or maximum length mark pair {14T, 4T} when it is detected within a mark detection time Tw with an RL ratio of at least four and the largest sum Lp (corresponding to the predetermined maximum value Lmax).

To this end, comparator 18 compares the ratio RL to four, and when the ratio RL is at least four, comparator 18 further compares the sum Lp with the current maximum value Lmax in register 94 (step S104). When the RL ratio is at least four and the sum Lp is greater than the current maximum value Lmax, the sum Lp may be a candidate for the target mark pair. Thus, this sum Lp is stored in the maximum value register 94 as a new current maximum value Lmax, and the total value Lsum and the count value C are reset to zero (step S106). Then, the next mark length is then measured (step S192'). In contrast, when the ratio RL is less than four or the sum Lp is less than or equal to the current maximum value Lmax in the register 94, the arithmetic unit 18 adds the measured value Lk to the total value Lsum (step S108). Note that the maximum value Lmax in the register 94 is initially set to zero (step S190).

The sync area interval is 1488T, and the desired maximum value Lmax of the sum Lp corresponds to the sum 18T of the maximum mark length 14T and the immediately following mark length 4T. Accordingly, if no sum Lp greater than the current maximum value Lmax in the register 94 is measured during the sync area interval (i.e., 1488T) after the detection of the current maximum value Lmax, that current maximum value Lmax in the register 94 can be defined as the predetermined maximum value Lmax or the target maximum mark pair length 18T. Since 1488T=(18T×82)+12T, the detection of marks within the sync area interval Ts will be completed when the total value Lsum becomes 82 times as large as the maximum value Lmax (i.e., 18T). In other words, when Lsum≧(Lmax×82), the detection can be completed. With this detection terminating condition, the detection time Tw can be arbitrarily set on the basis of the measured mark lengths (specifically, the total value Lsum and the maximum value Lmax).

In this embodiment, every time the total value Lsum reaches the predetermined maximum value Lmax (step S110), the maximum value Lmax is subtracted from the total value Lsum and the count value C is increased by one (step S114). Therefore, when the count value C reaches 82, the detection of marks over the sync area interval Ts is completed. Thus, by subtracting the maximum value Lmax from the total value Lsum, the number of bits of the total value Lsum in the register 12 is decreased so as to reduce the required storage capacity of register 12.

Comparator 18 compares the count value C with 82 (step S116). When the count value C is less than 82, the measured value Lk is stored in the measured value register 14 as the previously measured value PLk (step S112), and then, a subsequent mark length is then measured (step S192). In contrast, when the count value C has reached 82, the measurement is completed. Thereafter, based on the maximum value Lmax (i.e., 18T), the reference frequency (1/T) is obtained from the fundamental period T (=the maximum value Lmax/18).

Figure 10:
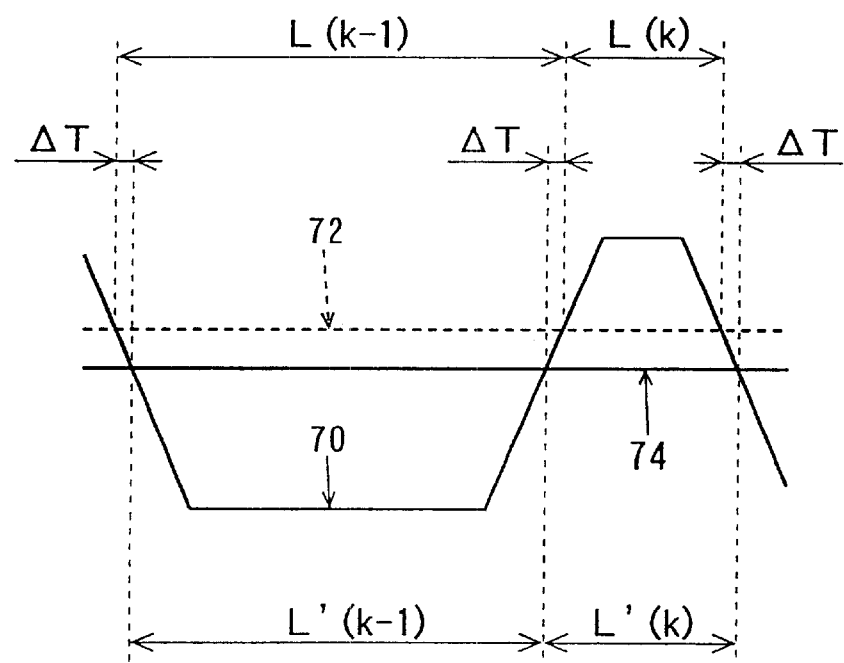
FIG. 10 illustrates an output waveform diagram.

Now, referring to the output waveform 70 as shown in FIG. 10, when the slice level is lowered (as shown with the reference numeral 74), the measured values L' (k−1) and L' (k) are:

$$L'(k-1)=L(k-1)-2\Delta T$$

$$L'(k)=L(k)+2\Delta T$$

Therefore, there is an error of $2\Delta T$ in the measured values. However, summing these values provides the following relationship:

$$L'(k-1)+L'(k)=L(k-1)+L(k)$$

Therefore, the measurement error $\Delta T$ of the mark lengths derived from the error in the slice level is canceled.

In this manner, the sum Lp (i.e., 18T) of the maximum mark length 14T and the subsequent mark length 4T of the target mark pair is detected as a modified maximum mark length. Unlike the case of detecting only a maximum mark length 14T as in the prior art, the maximum mark pair length can be accurately detected without a measurement error derived from an error in the slice level. Thus, the reference frequency can be precisely obtained.

The detection of the maximum mark pair length is completed when mark lengths over the sync area interval (i.e., 1488T) are measured after the detection of the maximum value Lmax (i.e., 18T). Accordingly, the minimum detection time in a preferred embodiment is substantially equal to the sync area interval Ts, which corresponds to the case where a first measured value is the maximum mark length 14T. Also, the maximum detection time is substantially twice as large as the sync area interval (i.e., 2Ts), which corresponds to the case where a first measured value is the mark length 4T immediately following the maximum mark length 14T. Thus, the detection of the maximum mark pair length can be carried out in 1.5Ts on the average.

Figure 3:
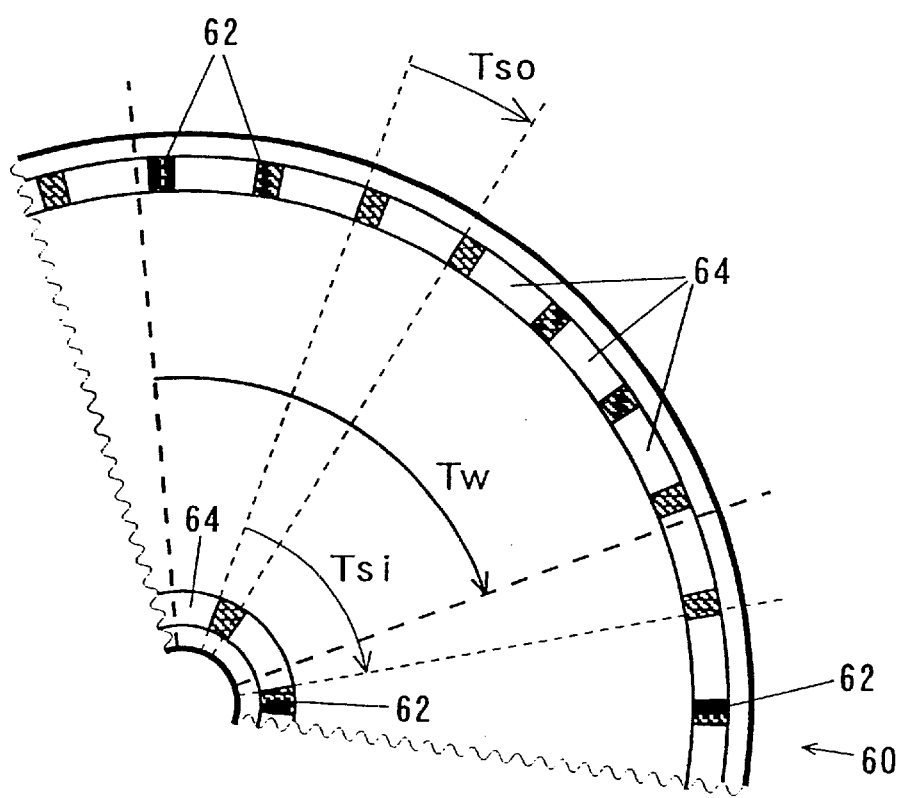
FIG. 3 illustrates a section of an optical disk including synch areas and shows a maximum mark length detection time for the maximum mark length detector of FIG. 1.

Since the completion of the detection time can be determined on the basis of the measured mark lengths (specifically, the total value Lsum and the maximum value Lmax) in this manner, the mark detection time can be set as a function of the sync area interval Ts. As is shown in FIG. 3, even in the outer circumference of a disk, the maximum mark pair length can be detected in time Tw, and on the average in 1.5T. The mark detection time does not need to be fixed as in the conventional technique but can be arbitrarily set. Therefore, the detection can be carried out in short time regardless of the radial positions of marks detected on the disk. As a result, the waiting time before starting to read data can be shortened.

Figure 4:
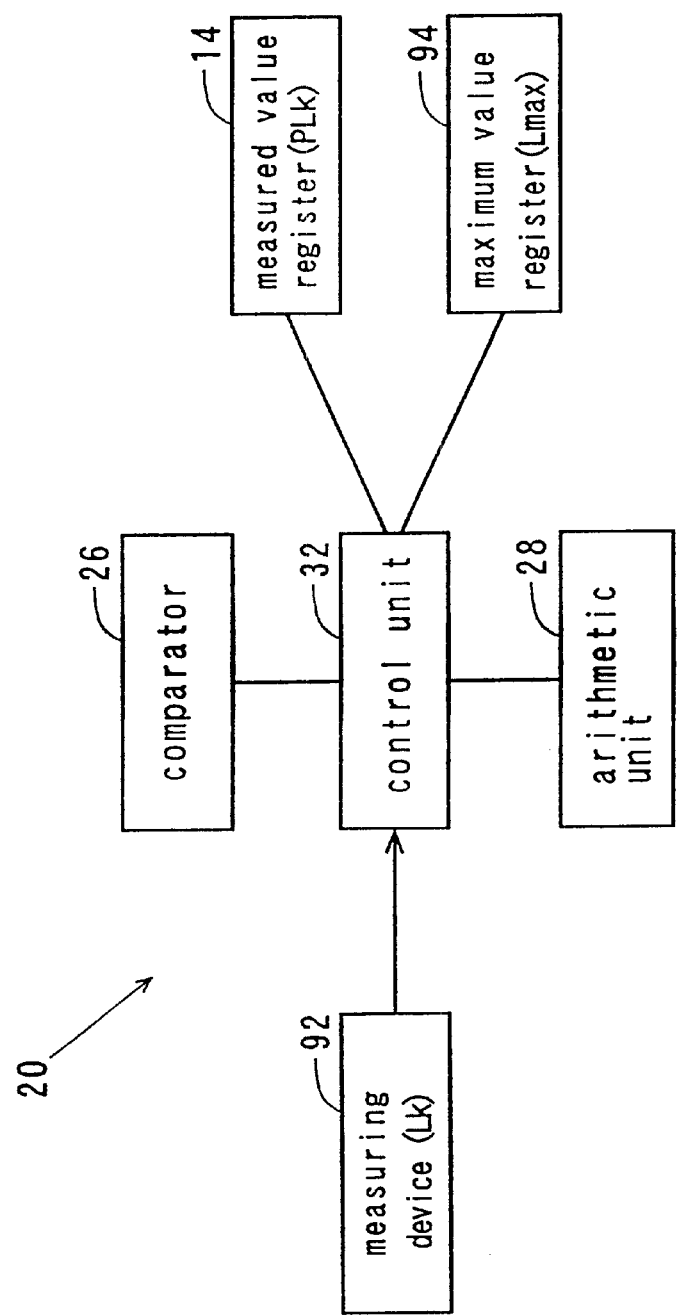
FIG. 4 illustrates a modified maximum mark length detector according to a further embodiment of the present invention.

FIG. 4 illustrates a modified maximum mark length detector 20 according to a further embodiment of the present invention. The measured value register 14 stores a measured value of a mark length in the same manner as in the aforementioned embodiment. The arithmetic unit 28 obtains the sum Lp of a current measured value Lk and a previously measured value PLk stored in the measured value register 14 in the same manner as in the aforementioned embodiment, and quadruples the current measured value Lk. The comparator 26 compares a value Lkr with the sum Lp. Lkr is obtained by multiplying the current measured value Lk by four. Comparator 26 also compares the sum Lp with a current maximum value Lmax in the register 94, and further compares an elapsed measurement time with a mark detection time Tw.

Figure 5:
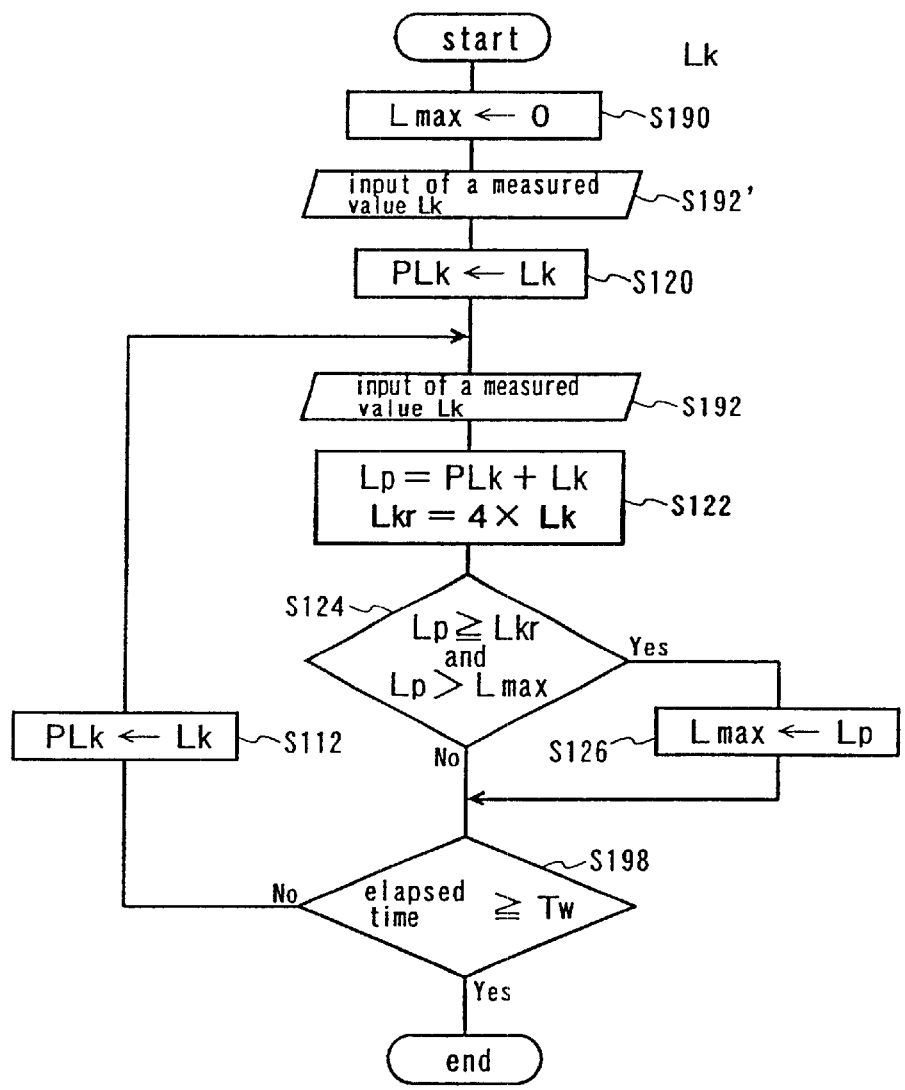
FIG. 5 illustrates a flowchart for detecting a maximum mark length using the maximum mark length detector of FIG. 4.
Figure 6:
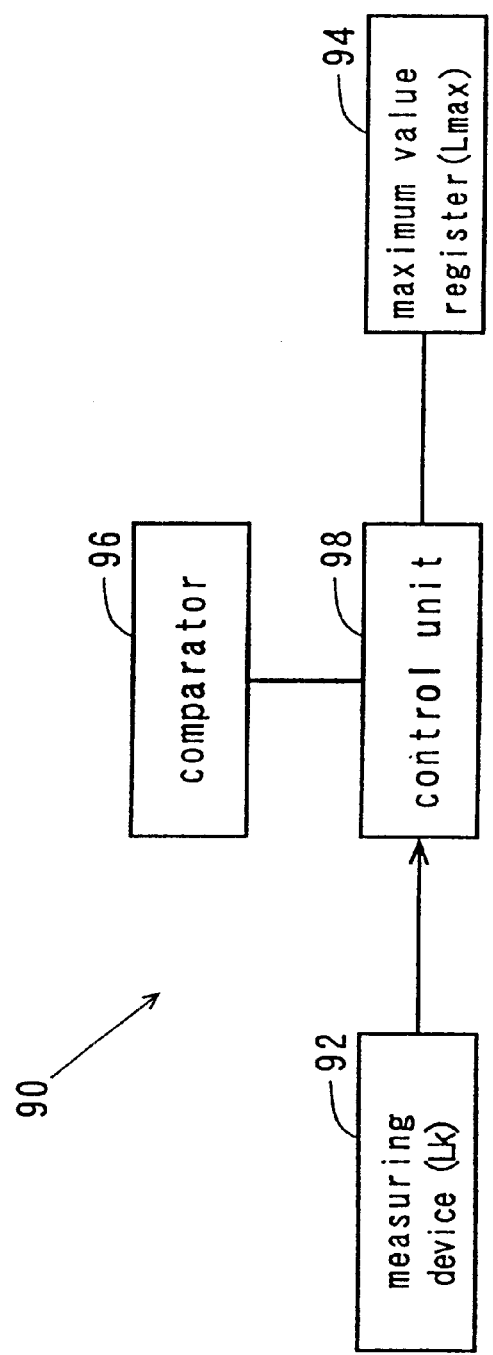
FIG. 6 illustrates a block diagram of a conventional maximum mark length detector.
Figure 7:
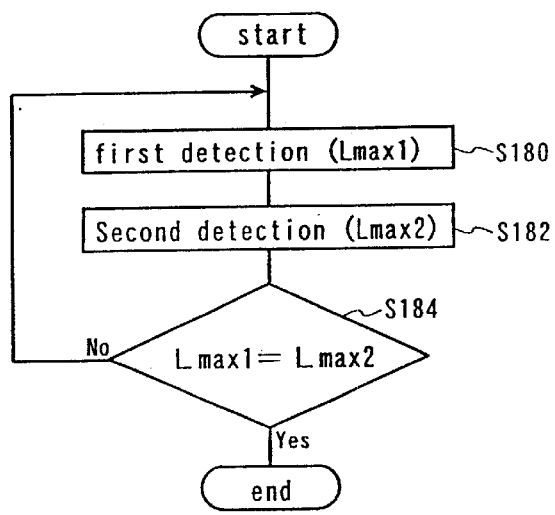
FIG. 7 illustrates a flowchart for detecting a maximum mark length using the conventional maximum mark length detector of FIG. 6.
Figure 8:
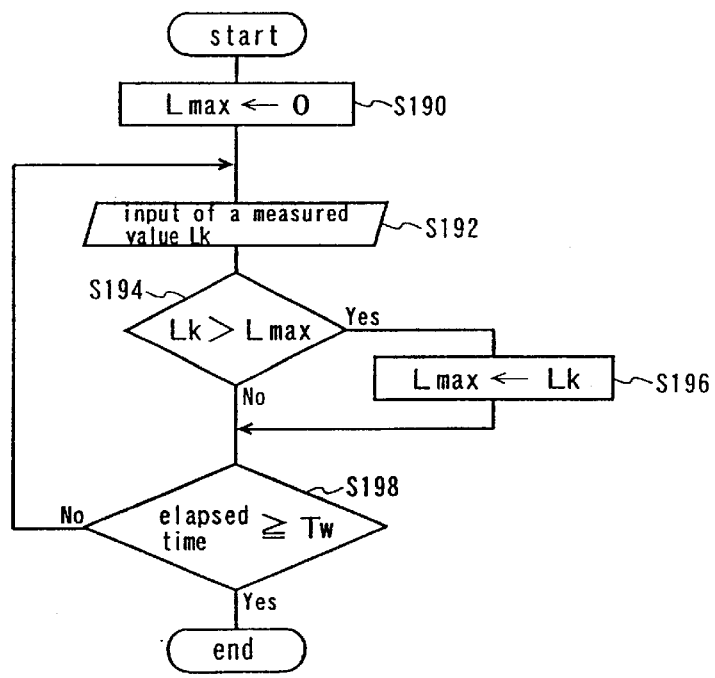
FIG. 8 illustrates a detailed flowchart for detecting maximum mark lengths with the FIG. 7 procedure.
Figure 9:
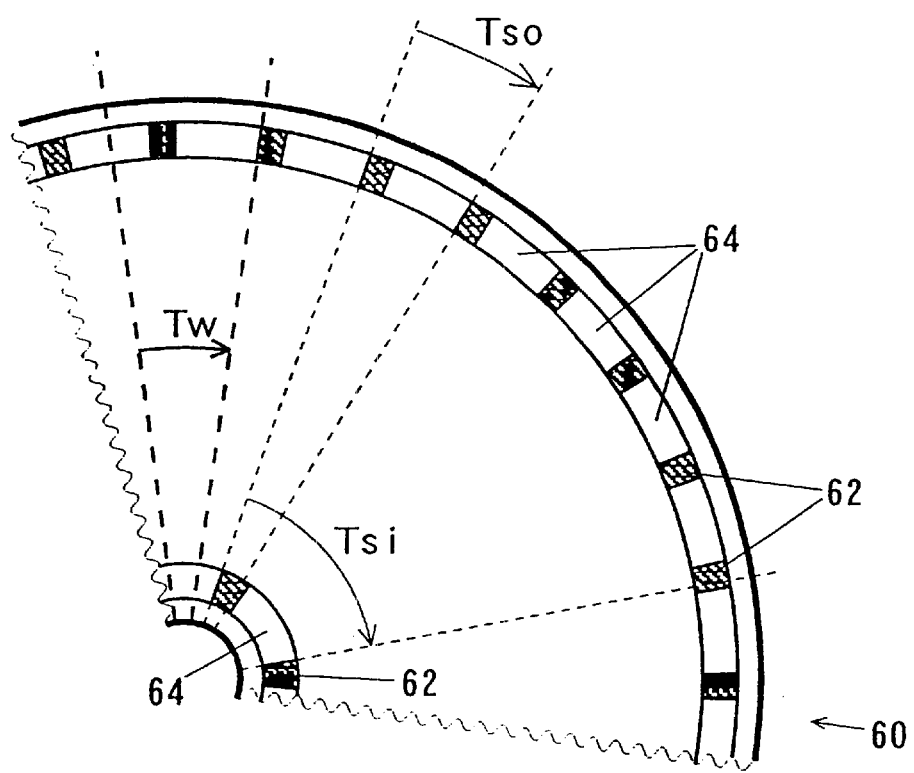
FIG. 9 illustrates an optical disk and shows a conventional maximum mark length detection time.

When this maximum mark length detector 20 is used, the maximum mark pair length can be detected similarly to the aforementioned embodiment. Also, the comparison of (PLk+Lk)÷Lk≧4 is carried out as PLk+Lk ≧4 ×Lk, as shown in steps S122 and S124 in FIG. 5. The calculation of 4×Lk can be carried out through a simple shift operation.

The measurement of the maximum mark pair length may be repeated, so as to confirm the accuracy of the mark length detection. If the maximum mark pair length is not detected, an error message is sent to the system. The predetermined value (specifically 82 in the disk in a preferred embodiment) to be compared with the count value C can be arbitrarily set in accordance with the sync area interval Ts and the maximum mark pair length.

Also, the predetermined value (specifically four in a preferred embodiment) to be compared with the ratio RL can be arbitrarily set in accordance with the lengths of marks recorded on the disk. Furthermore, in a preferred embodiment, the mark pairs which give a ratio RL of at least four are the target mark pair of {14T, 4T} (with the ratio RL of 4.50), the mark pairs of {11T, 3T} (with the ratio RL of 4.67), {10T, 3T} (with the ratio RL of 4.33), and {9T, 3T} (with the ratio RL of 4.00). Accordingly, when the errors Δr of the obtained ratios RL are so small that the respective ratios RL can be distinguished from one another, the maximum mark pair length can be identified by the following condition alone:

$$4.5-\Delta r \leq RL \leq 4.5+\Delta r$$

Furthermore, for example, for disks where the marks in data areas have lengths of 3T through 11T, and that the maximum mark length is 16T and the adjacent mark length is 8T in a disk to be detected, only the maximum mark pair has a length of 24T (=16T +8T). Therefore, the maximum mark pair can be identified by using the sum (i.e., 24T) alone. In other words, in such disks, there is no need to obtain the ratio RL, rather only the comparison between the sum Lp and the maximum value Lmax is required.

Based on the accompanying drawings, embodiments of the apparatus and method for detecting a maximum mark length according to the present invention have been described, however, the invention is not limited to the devices and methods shown in the drawings. For example, the disk used to detect the maximum mark length is not limited to a DVD and the like but may be any type of disk. Also, any suitable mark patterns may be used. Accordingly, it will be apparent to those skilled in the art that various changes, improvements or modifications can be made thereto without departing from the spirit or scope of the present invention.

According to the present invention, the sum of the length of a longest mark and the length of an immediately following mark is detected as a modified maximum mark length. Thus, the measurement can be accurately performed without measurement error due to variations in the slice level, unlike the case where a maximum mark length is detected alone.

Moreover, according to the present invention, the completion of a detection time can be determined on the basis of the maximum mark pair length and the total value of the measured values. Thus, the detection time can be arbitrarily set to a very short time as a function of the sync area interval. Therefore, the maximum mark pair length can be efficiently detected regardless of the radial position (inner circumference or outer circumference) of marks on the disk.

What is claimed is:

1. A method of detecting a maximum mark length used for computing a reference frequency for signals to be read from a disk medium in which data are recorded by using predetermined marks having different lengths in a circumferential direction, and sync areas spaced at a predetermined interval in the circumferential direction, each sync area includes a mark pair comprising a longest mark and a short mark, comprising the steps of:

measuring a length of a first mark;
measuring a length of a second mark;
computing a first mark pair length comprising a sum of said first and second mark lengths;
determining a maximum mark pair length; and
computing said reference frequency using said maximum mark pair length.

2. The method of detecting a maximum mark length of claim 1, further comprising the steps of:

computing a total value of mark lengths measured after a current maximum value of the sum of said measured mark lengths is newly detected; and
completing the method of detecting a maximum mark length when said total value reaches a value corresponding to an interval between a first and a second of said longest marks.

3. A maximum mark length detector for detecting a maximum mark length used for computing a reference frequency for signals to be read from a disk medium in which data are recorded by using predetermined marks respectively having different lengths in a circumferential direction and sync areas spaced at a predetermined interval in the circumferential direction, each sync area includes a mark pair comprising a longest mark and a short mark, comprising:

a measured value register for storing a measured mark length;
an arithmetic unit to compute a mark pair sum comprising a sum of a current measured mark length and a previously measured mark length stored in said measured value register; and
a comparator to determine a maximum mark pair length, wherein said reference frequency is computed using said maximum mark pair length.

4. The maximum mark length detector of claim 3, wherein the arithmetic unit computes a ratio between the sum obtained by said adder and the current measured mark length, and the comparator compares the ratio computed by said arithmetic unit with a predetermined value to determine whether the sum corresponds to a maximum mark pair length.

5. The maximum mark length detector of claim 4, wherein said predetermined value is a multiple of two.

6. The maximum mark length detector of claim 3, further comprising:

a total value register to store a total value of mark lengths measured after a current maximum value of the mark pair sums is detected;
a detection completion logic unit; and
wherein the arithmetic unit adds a measured value to said total value, and the detection completion logic unit determines the method of detecting a maximum mark length is complete when said total value reaches a value corresponding to an interval between a first and a second of said longest marks.

7. The maximum mark length detector of claim 3, further comprising:

a total value register to store a total value of mark lengths measured after a current maximum value of the mark pair sums is detected;
a counter; and
wherein the arithmetic unit adds a measured value to said total value, the arithmetic unit subtracts said maximum mark pair length from said total value when said total value reaches said maximum mark pair length, the counter counts a number of subtractions performed, and the counter determines the method of detecting a maximum mark length is complete when a count value reaches a predetermined value.

8. The maximum mark length detector of claim 7, wherein said predetermined value to be compared with said count value is a quotient computed by dividing the interval between said sync areas by said maximum mark pair length.

9. The maximum mark length detector of claim 3, further comprising:

a total value register to store a total value of mark lengths measured after a current maximum value of the mark pair sums is detected, wherein the arithmetic unit adds a measured value to said total value; and
detection completion logic means for determining the method of detecting a maximum mark length is complete when said total value reaches a value corresponding to an interval between a first and a second of said longest marks.

10. The maximum mark length detector of claim 9, wherein said detection completion logic means comprises:

an arithmetic unit to subtract said maximum mark pair length from said total value when said total value reaches said maximum mark pair length; and
a counter to count a number of subtractions performed, and to determine the method of detecting a maximum mark length is complete when a count value reaches a predetermined value.

11. The maximum mark length detector of claim 4, further comprising:

a total value register to store a total value of mark lengths measured after a current maximum value of the mark pair sums is detected;
a detection completion logic unit; and
wherein the arithmetic unit adds a measured value to said total value, and the detection completion logic unit determines the method of detecting a maximum mark length is complete when said total value reaches a value corresponding to an interval between a first and a second of said longest marks.

12. The maximum mark length detector of claim 4, further comprising:

a total value register to store a total value of mark lengths measured after a current maximum value of the mark pair sums is detected;
a counter; and
wherein the arithmetic unit adds a measured value to said total value, the arithmetic unit subtracts said maximum mark pair length from said total value when said total value reaches said maximum mark pair length, the counter counts a number of subtractions performed, and the counter determines the method of detecting a maximum mark length is complete when a count value reaches a predetermined value.

13. The maximum mark length detector of claim 12, wherein said predetermined value to be compared with said count value is a quotient computed by dividing the interval between said sync areas by said maximum mark pair length.

14. The maximum mark length detector of claim 3 further comprising an optical measuring device to measure mark lengths.

15. The method of detecting a maximum mark length of claim 1, wherein the step of determining a maximum mark pair length further comprises the steps of:

computing a ratio between the sum and a current measured mark length; and comparing the ratio with a predetermined value to determine whether the sum corresponds to a maximum mark pair length.

16. The method of detecting a maximum mark length of claim 15, further comprising the steps of:

computing a total value of mark lengths measured after a current maximum value of the sum of said measured mark lengths is newly detected; and determining the method of detecting a maximum mark length is complete when said total value reaches a value corresponding to an interval between a first and a second of said longest marks.

17. The method of detecting a maximum mark length of claim 2, wherein the step of determining a maximum mark pair length further comprises comparing the sum with a predetermined value to determine whether the sum corresponds to a maximum mark pair length.

* * * * *

UNITED STATES PATENT AND TRADEMARK OFFICE
CERTIFICATE OF CORRECTION

PATENT NO.    : 6,421,309 B1
DATED         : July 16, 2002
INVENTOR(S)   : Toshio Kanai & Teruhiko Ushio It is certified that error appears in the above-identified patent and that said Letters Patent is hereby corrected as shown below:

<u>Column 8,</u>
Line 27, in place of the last word, Ar, insert -- $\Delta r$ --

Signed and Sealed this

Nineteenth Day of November, 2002

*Attest:*

*Attesting Officer*

JAMES E. ROGAN
*Director of the United States Patent and Trademark Office*